(12) United States Patent
Jordan et al.

(10) Patent No.: US 10,372,098 B2
(45) Date of Patent: Aug. 6, 2019

(54) METHOD FOR CONTROLLING A GRID OF PLANTS

(71) Applicant: Siemens Aktiengesellschaft, Munich (DE)

(72) Inventors: Carsten Jordan, Erlangen (DE); Matthias Jung, Bubenreuth (DE); Klaus-Juergen Langer, Oberasbach (DE); Denis Schroff, Eggenstein-Leopoldshafen (DE); Michael Unkelbach, Buckenhof (DE); Egon Wuchner, Biessenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 206 days.

(21) Appl. No.: 15/102,622

(22) PCT Filed: Nov. 27, 2014

(86) PCT No.: PCT/EP2014/075742
§ 371 (c)(1),
(2) Date: Jun. 8, 2016

(87) PCT Pub. No.: WO2015/086328
PCT Pub. Date: Jun. 18, 2015

(65) Prior Publication Data
US 2017/0261958 A1 Sep. 14, 2017

(30) Foreign Application Priority Data
Dec. 10, 2013 (EP) ..................................... 13196528

(51) Int. Cl.
*G05B 19/042* (2006.01)
(52) U.S. Cl.
CPC ..... *G05B 19/0423* (2013.01); *G05B 19/0425* (2013.01); *G05B 2219/21062* (2013.01)

(58) Field of Classification Search
CPC ........................ G05B 19/0423; G05B 19/0425
See application file for complete search history.

(56) References Cited

U.S. PATENT DOCUMENTS

| 4,947,314 A * | 8/1990 | Sumida .................. B25J 9/1661 700/12 |
| 6,802,014 B1 * | 10/2004 | Suurballe .............. G06F 1/3203 713/300 |

(Continued)

FOREIGN PATENT DOCUMENTS

| CN | 101426024 | 5/2009 |
| CN | 101825890 | 9/2010 |

(Continued)

OTHER PUBLICATIONS

Office Action dated Jan. 31, 2018 which issued in the corresponding Chinese Patent Application No. 201480066666.5.

(Continued)

*Primary Examiner* — Mark A Connolly
(74) *Attorney, Agent, or Firm* — Cozen O'Connor (57) ABSTRACT

A method for controlling a grid of plants, wherein the method includes interconnecting distributed control systems via a network, providing a hierarchical tree structure having at least two levels (LN) for the network, assigning each distributed control system to a node of the tree structure, receiving a data request at a parent node control system, determining whether the data request is resolvable by the parent node control system, where a reply to the data request is sent if the data request can be resolved by the parent node, and where the data request is forwarded to at least one of the child nodes of the parent node if the data request is unresolvable by the parent node such that monitoring and controlling of the entire grid with respect to the inclusion of (Continued)

further units and the modification of already existing units is achieved in a flexible manner.

12 Claims, 6 Drawing Sheets

(56) References Cited

U.S. PATENT DOCUMENTS

| | | | | |
|---|---|---|---|---|
| 2003/0069955 | A1* | 4/2003 | Gieseke | H04L 41/0213 |
| | | | | 709/223 |
| 2004/0197615 | A1* | 10/2004 | Mirkovic | G05B 19/0421 |
| | | | | 429/429 |
| 2012/0089239 | A1 | 4/2012 | Sentgeorge et al. | |
| 2013/0123963 | A1* | 5/2013 | Cooper | G05B 19/02 |
| | | | | 700/95 |
| 2015/0012146 | A1 | 1/2015 | Cherian et al. | |

FOREIGN PATENT DOCUMENTS

| | | |
|---|---|---|
| CN | 102725933 | 10/2012 |
| CN | 103221891 | 7/2013 |

OTHER PUBLICATIONS

Gyurjyan Vardan et al; "AFECS. Multi-Agent Framework for Experiment Control Systems"; Journal of Physics: Conference Series Institute of Physics Publishing; vol. 119; No. 2; the whole document; ISSN: 1742-6596; p. 22025; XP020139439; Jul. 2008.
"IEEE Application Guide for Distributed Digital Control and Monitoring for Power Plants"; IEEE Standard 1046-1991; XP017602559; 1991; p. 22-p. 36; p. 41-p. 46; p. 53-p. 69; p. 1.

* cited by examiner

METHOD FOR CONTROLLING A GRID OF PLANTS

CROSS-REFERENCE TO RELATED APPLICATIONS

This is a U.S. national stage of application No. PCT/EP2014/075742 filed 27 Nov. 2014. Priority is claimed on European Application No. 13196528 filed 10 Dec. 2013, the content of which is incorporated herein by reference in its entirety.

BACKGROUND OF THE INVENTION

1. Field of the Invention

The invention is related to a method for controlling a grid of plants, where each plant includes a distributed control system with operation and monitoring functionality, comprising the step of interconnecting the distributed control systems via a network.

2. Description of the Related Art

The current state of distributed control systems (DCS) for any type of plants like refineries or in particular power generation plants is to have one DCS with operation and monitoring (O&M) functionality per plant. The entire range of O&M functionality includes functions such as configuration/engineering of units, generating dynamic plant displays, archiving of process data, generating reports, providing alarming and diagnostic functionality. The DCS allows operating and monitoring the whole plant and its local generation units by several human machine interface (HMI) clients on the same site.

This kind of plant-specific DCS does not cover the situation of having a grid of multiple (geographically) distributed plants/units that need to be operated and monitored. The units may be small (e.g., wind turbines) or larger and of different kinds. In the following context the terms "unit" or "plant" are related to a power generating entity. One approach for a solution of control of such distributed units is called SCADA (supervisory control and data acquisition). In the SCADA approach, all (geographically distributed) units are connected via a network to a central control room, and supervision and control of these units are centralized in the control room. Each plant site or even each unit of a plant site contains the engineering and process values of its plant/unit's automation and information systems. This process image (i.e., the collection of dynamic process values) is available for the local subordinate SCADA system and on the remote superordinate systems. The superordinate SCADA system contains its own engineering and process values and all process images of its subordinate SCADA systems. Although the process image of a subordinated system located on the superordinate SCADA system is equal to the process image of the subordinate SCADA system apart from being connected to the subordinate system, the process images must be engineered again for the superordinate unit (inclusive plant displays, or alarm lists).

As current SCADA systems operate with a single process image, it results in one big process image hosting all data from all process images of its own and all subordinate systems. From this, it follows the SCADA system on the superordinate unit does not scale with the amount of subordinate units resulting in exceeding the limits of resources like memory or CPU load. Furthermore, required changes to the engineering of a subordinate system have to be retightened on the superordinate system. This includes all changes made to the process image and the plant displays.

SUMMARY OF THE INVENTION

In view of the foregoing, it is an object of the invention to provide a method for controlling a grid of plants that allows monitoring and controlling of the entire grid and that is flexible with respect to the inclusion of further units and the modification of already existing units.

This and other objects and advantages are achieved in accordance with the invention by a method comprising providing a hierarchical tree structure having at least two levels for said network, assigning each distributed control system to a node of the tree structure, receiving a data request at a parent node control system, determining whether the data request can be resolved by the parent node control system, if the data request can be resolved by the parent node, sending a reply to the data request, if the data request cannot be resolved by the parent node, forwarding the data request to at least one of the child node of the parent node.

The invention is based on the consideration that it is desirable to build up a topology of subordinate and superordinate units that covers the entire set of geographically distributed units. In addition, compared to a SCADA approach, which builds up a central control room over all units to be supervised and controlled, this topology should scale over a large number of distributed units.

Each local O&M has to be self-sustaining and operational. The local subordinate unit O&M system should either encompass the full O&M functionality or it should be spread over the subordinate and its superordinate unit. On the other hand, the HMI of a superordinate system should support the display of any O&M information of its subordinate units. The HMI display of a superordinate O&M system should be able to support both options, either to include only the subordinate systems on the next lower level or all subordinate systems over all lower levels. In contrast, a subordinate O&M system should be unable to display O&M information of its superordinate unit.

In addition, an Information Management System (IMS) should be deployable on any unit, thus having access to information provided by all O&M systems of the directly subordinate units or all lower level subordinate units if needed. This allows providing IMS functionality like asset management, fleet control and key performance indicator (KPI) calculators for certain parts of the whole plant and unit topology or even the whole topology.

Also, the system should be robust against failures. For example the O&M system of a subordinate unit fails and the superordinate O&M system still needs to provide the O&M system data even for locally affected subordinate units. In case of O&M failures of a superordinate unit, the subordinate O&M systems should still work and be used by local HMI clients.

All these demands are met by using a topology of a cascaded system of units. Such a cascaded system of units has real units as leaf nodes and other real (and possibly larger) units as tree nodes on the upper levels.

Regarding data requests, the method further comprises receiving a data request at a parent node control system, determining whether the data request can be resolved by said parent node control system, if the data request can be resolved by the parent node, sending a reply to the data request, if the data request cannot be resolved by the parent node, forwarding the data request to at least one of the children nodes of said parent node. In other words, data requests at an HMI interface in a superordinate level control system are forwarded along the parent/child paths of the cascaded system until they reach a node where they can actually be processed.

In a preferred embodiment, the method further comprises assigning a virtual control system to a parent node having a number of children nodes. This means that at the upper levels of the tree structure, nodes need not represent real units, but rather virtual units that only comprise the hardware and software capabilities of controlling a number of child node systems, but do not control their own real plant. In particular, the root node of the tree structure may be a virtual system, i.e., the entire tree structure may be monitored at one single virtual root node.

Furthermore, the method advantageously comprises forwarding a reply to the data request from said children node to said parent node. That is, the information about the process objects in the subordinate node that form the reply to the request are provided back along the chain of request up to the parent node at which the request was made.

The same request forwarding mechanism can be applied to retrieve update information of process objects. To this end, the method advantageously further comprises forwarding updated data information from a child node via its respective parent node to a root control system of the network. With an update information mechanism that transports the information over the branches of the tree to the root, all information about processes of all nodes is updated and available at the root node control system.

In a further preferred embodiment, the method comprises providing a redundant control system for the distributed control system of a node, where the redundant control system is assigned to an ancestor node of said node. In the presently contemplated embodiment, redundancy of O&M systems over one or more levels is introduced to build up a scalable cascaded system of units with respect to network traffic and needed resources on units. Redundant services of the O&M system are not deployed on a device in the same unit, but on a device of a superordinate unit, i.e., services of subordinate systems are deployed in parallel to the O&M services of a respective superordinate O&M system, i.e., this distributed redundancy mechanism on a superordinate unit is applied to O&M services of the next level or some more levels of subordinate units.

However, each superordinate unit must be able to host the redundant O&M systems of all subordinate units. The more redundant services a unit hosts, the more device/hardware resources it must provide. Therefore, in a particularly preferred embodiment, the redundant control system is assigned to the parent node of the node. The redundancy mechanism over one subordinate level only provides the best trade-off with respect to hardware resources.

In another advantageous embodiment, the method further comprises providing an operation and monitoring service for the distributed control system of a node, where the operation and monitoring service is assigned to an ancestor node of the node. O&M services and functionality of a subordinate unit level can be either deployed on the unit itself or on one of its superordinate units. This second option applies to resource-constrained units not being able to host the whole range of O&M functionality.

Again, the more services a superordinate unit hosts, the more device/hardware resources it must provide. Due to the same reasons as with the redundant services above, the operation and monitoring service is advantageously assigned to the parent node of the node.

A grid of plants is preferably controlled by the described method.

A distributed control system preferably comprises a parent node interface and/or a child node interface and means for enabling the distributed control system to operate within the described method. The distributed control system thus provides all necessary functionality to provide the request and update forwarding mechanisms, the redundancy mechanism and the service mechanism as described above in a tree-structured grid of plants.

A plant advantageously comprises such a distributed control system.

A virtual control system, i.e., a control system having the hardware and software capacity for providing O&M services for plants but only serves as a superordinate unit for a plurality of subordinate units advantageously comprises a child node interface and means for enabling the virtual control system to operate within the described method.

A grid of plants advantageously comprises such a plant and/or such a virtual control system.

The advantages achieved via the invention particularly comprise the provision of a fault-tolerant system and a reduction of the need of high/hardware redundancy of O&M systems. A cascaded system with distributed redundancy avoids the collection of all data by one SCADA system as a central system only. Instead, a topology of a cascaded system of leaf units, several upper level units and one unit at the top level, with several alternative paths from one leaf unit to units on middle levels can avoid the big resource consumption for single services of such a central system.

Every process object in the complete hierarchy of the cascaded system is only engineered once on the unit of a certain level of the cascade system this process object belongs to. The process object is also synchronized to its counterpart of the redundant O&M service. Therefore, engineering of additional changes (i.e., delta engineering) is only performed in one unit and is always consistent in the complete cascaded system.

Superordinate systems always scale, as the static and dynamic data from the subordinated systems are processed within the services of these subordinated systems, so that the services of the superordinate system will not reach its technical limits. Redundant services are installed remotely (scaling, because different services can be deployed on different computers at least compared to one big service).

Level-one-distributed-redundancy allows reduction of the network traffic between the O&M and automation systems of all units of the cascaded system of units by way of combination of the redundancy mechanism and the request forwarding mechanism. Requests on a superordinate unit are handled locally by redundant O&M services of subordinate units as far as possible and forwarded downwards only along the chain of subordinate units otherwise.

The combined deployment of redundant O&M services of different subordinated units on one (or more) large hardware device (s) on the superordinate system yields benefits, such as less hardware devices compared to multiple redundant devices on several subordinate units and can be used for virtual deployments such as in a cloud.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiments of the invention are explained in the following figures, in which.

DETAILED DESCRIPTION OF THE EXEMPLARY EMBODIMENTS

Like reference numerals designate like parts in all figures.

Figure 1:
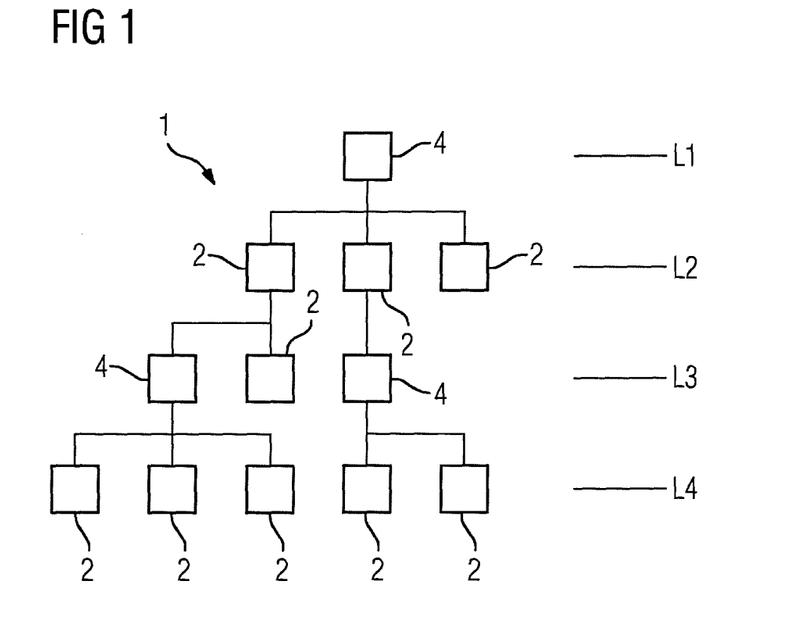
FIG. 1 shows a grid of power plants arranged in a hierarchical tree structure.

FIG. 1 shows a tree structure 1 representing a grid of power plants. It is understood that although the embodiment described in the following refers to a grid of power plants, the invention described herein is suitable for grids of any type of plants, e.g., refineries, any power generating entities or other plants. Here, the term grid refers to a network, and should not be taken to imply a particular physical layout or breadth. Grid may also be used to refer to an entire electrical network of a continent, a regional transmission network or may be used to describe a subnetwork, such as a local utility's transmission grid or distribution grid. The grid consists of geographically distributed power plants or units of different kinds, such as gas turbine plants, steam turbine plants, or wind turbines.

Regarding nomenclature, the tree elements are called nodes. The lines connecting elements are called branches. Nodes without children are called leaf nodes. As the invention relates to real systems, the tree structure is finite and thus has a member that has no superior. This member is called the root or root node. The names of relationships between nodes are modeled after family relations: a node's parent is a node one step higher in the hierarchy (i.e., closer to the root node) and lying on the same branch, a node's child is a node one step lower in the hierarchy and lying on the same branch. Sibling nodes share the same parent node. A node's uncles are siblings of that node's parent. A node that is connected to all lower-level nodes is called an ancestor. The connected lower-level nodes are descendants of the ancestor node.

The levels LN of the tree structure 1 are shown in the right portion of FIG. 1. The tree structure 1 in FIG. 1 has four levels L1, L2, L3, L4. The nodes of the tree structure 1 represent distributed control systems 2 or virtual control systems 4. Each distributed control system 2 is part of a real power plant. A virtual control system 4 serves only as a superordinated unit to a plurality of real or virtual units. All leaf nodes have real units, i.e., are virtual control systems 4, and virtual or other real (and possibly larger) power generation units are tree nodes on the upper levels. The tree structure 1 of FIG. 1 has only distributed controls systems 2 at the bottom level L4 and ends up with one virtual unit at the top level L1.

Each distributed control system 2 uses custom designed processors as controllers and uses both proprietary interconnections and communications protocol for communication. Input and output modules form component parts of the distributed control system. The processor receives information from input modules and sends information to output modules. The input modules receive information from input instruments in the process (or field) and transmit instructions to the output instruments in the field. Computer buses or electrical buses connect the processor and modules through multiplexer or demultiplexers. Buses also connect the distributed controllers with the central controller and finally to the human-machine interface or control consoles.

The formation of a tree structure 1 and assigning the power plants of the grid to the nodes of the tree structure 1 is the first step of the particular flexible method of controlling the grid described in the following.

Figure 2:
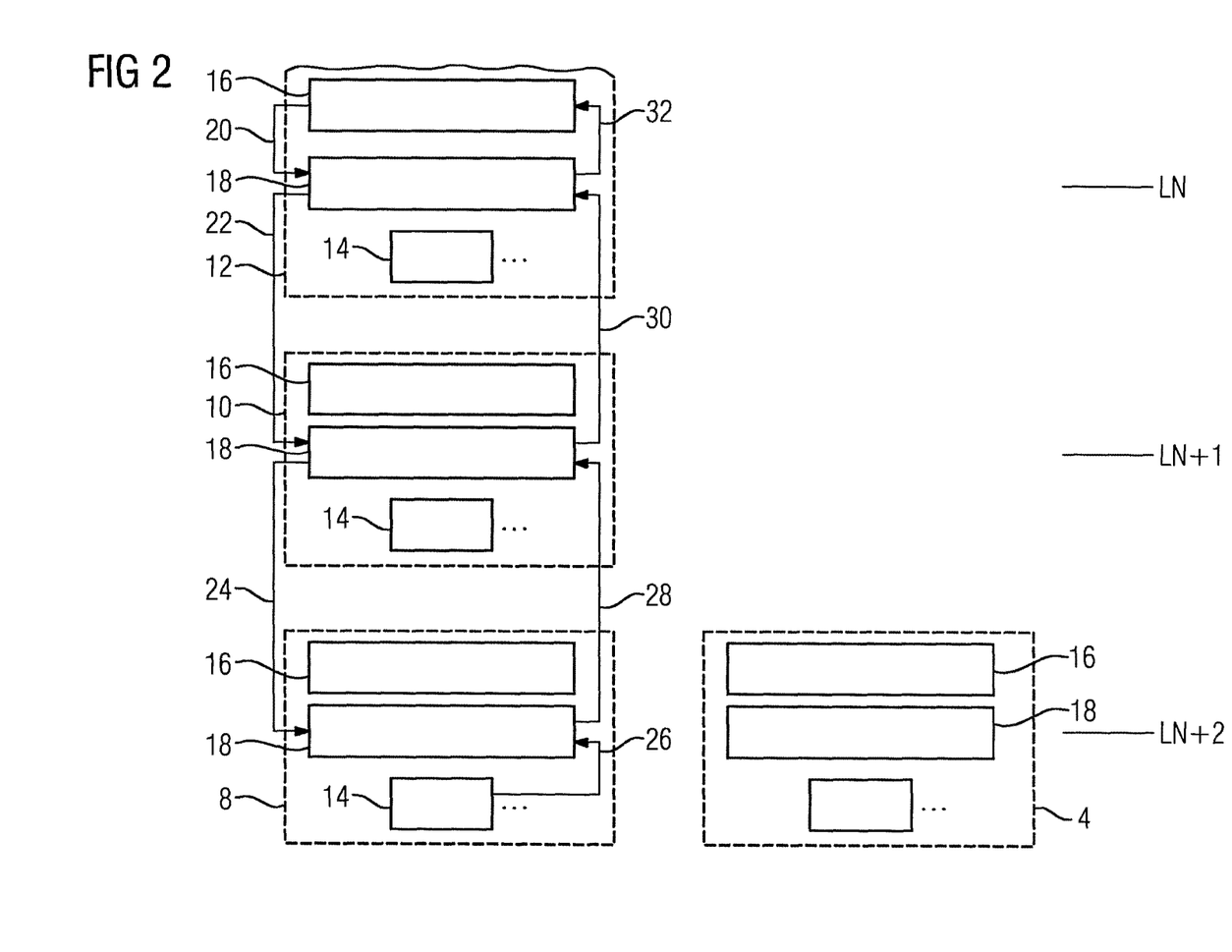
FIG. 2 shows a part of the tree structure with request and update paths.

FIG. 2 sketches three levels LN, LN+1, LN+2 of such a cascaded system, i.e., a tree structure 1. The bottom level LN+2 consists of the real leaf nodes assigned to unit 4 and unit 8. The first upper level LN+1 consists of unit 10 being a parent to unit 4 and unit 8. The top level LN is made up of unit 12 being a parent to unit 10. Each unit 4, 8, 10, 12 comprises a power generating entity and is controlled by its own distributed control system 2 comprising an automation system 14 (AS), human-machine interface 16 (HMI) and operation and monitoring 18 (O&M) functionality. The AS 14, HMI 16 and O&M 18 in every unit are operational and self-sustaining by providing access to the O&M data of the own unit.

In addition, the HMI 16 on unit 10 has access to the information provided by O&M 16 on unit 4 and O&M 16 on unit 8. Every O&M 18 system on a unit 4, 8, 10, 12 has its own structure of process objects. But the HMI 16 of unit 10 is able to display information about process objects from unit 4 and unit 8 by accessing their respective O&M 18 hosted on unit 6 and unit 8. Furthermore, HMI 16 of unit 12 is able to display process object information from unit 10 and unit 4 or unit 8. This is accomplished by forwarding requests along the parent/child paths of the cascaded tree structure 1.

For instance, FIG. 2 depicts the interaction if the operator using the HMI 16 of unit 12 wants to open a plant display of unit 8. The process object information request is processed by O&M 18 on unit 12 (arrow 20), forwarded from O&M 18 on unit 12 via the O&M 18 on unit 10 (arrow 22) down to unit 8 by asking O&M 18 on unit 10 for this information. In turn, O&M 18 on unit 10 forwards the request down to its child unit 8 and its O&M 18 system (arrow 24).

This initial information about the process objects on unit 8 is provided back along the chain of request (arrows 28, 30) up to unit 12 along the O&M 18 systems from the lowest unit 8 of the cascaded system to the unit 12 triggering the request on an upper level LN. The information received by O&M 18 on unit 12 is then displayed on the HMI 16 on unit 12 (arrow 32).

Additionally, plant displays with mixed process values from unit 4, unit 8, unit 10 and unit 12 can be displayed in HMI 16 on unit 12. In this case, only the data requests are forwarded, whereas the plant display itself is located in O&M 18 of unit 12.

The same request forwarding mechanism applies to retrieve update information of process objects from unit 8 and is indicated by the arrows 26, 28, 30, 32. As an additional step, O&M 18 on unit 8 has to retrieve the update information directly from its automation system 14 (arrow 26). In addition, the same chain of AS 14 and O&M 18 systems can be used to propagate update information on a regular basis from automation system 14 of unit 8 to HMI 16 of unit 12.

In general, request forwarding and information updates work the following way. A service in a superordinate unit 12 receives request for process information from a client like an HMI 16 on the superordinate unit 12. If the request can be resolved within the own unit 12, the reply is sent immediately. If the request can be resolved only in a subordinated unit 4, 8, 10, the request is forwarded to the corresponding service in the subordinated unit 10 on the next lower level, resolved there, and the reply is sent to the superordinate service, which routes it back to its own client. If the request needs to be resolved by more than one unit 4, 8, 10, the superordinate service splits the request into requests for the relevant subordinate units 4, 8, 10, forwards these requests and receives the replies. It either combines the replies together to one reply for the client or routes all replies individually back to the client (this depends on the type of service, such as, alarming, archive, reports, trends, or plant displays).

Figure 3:
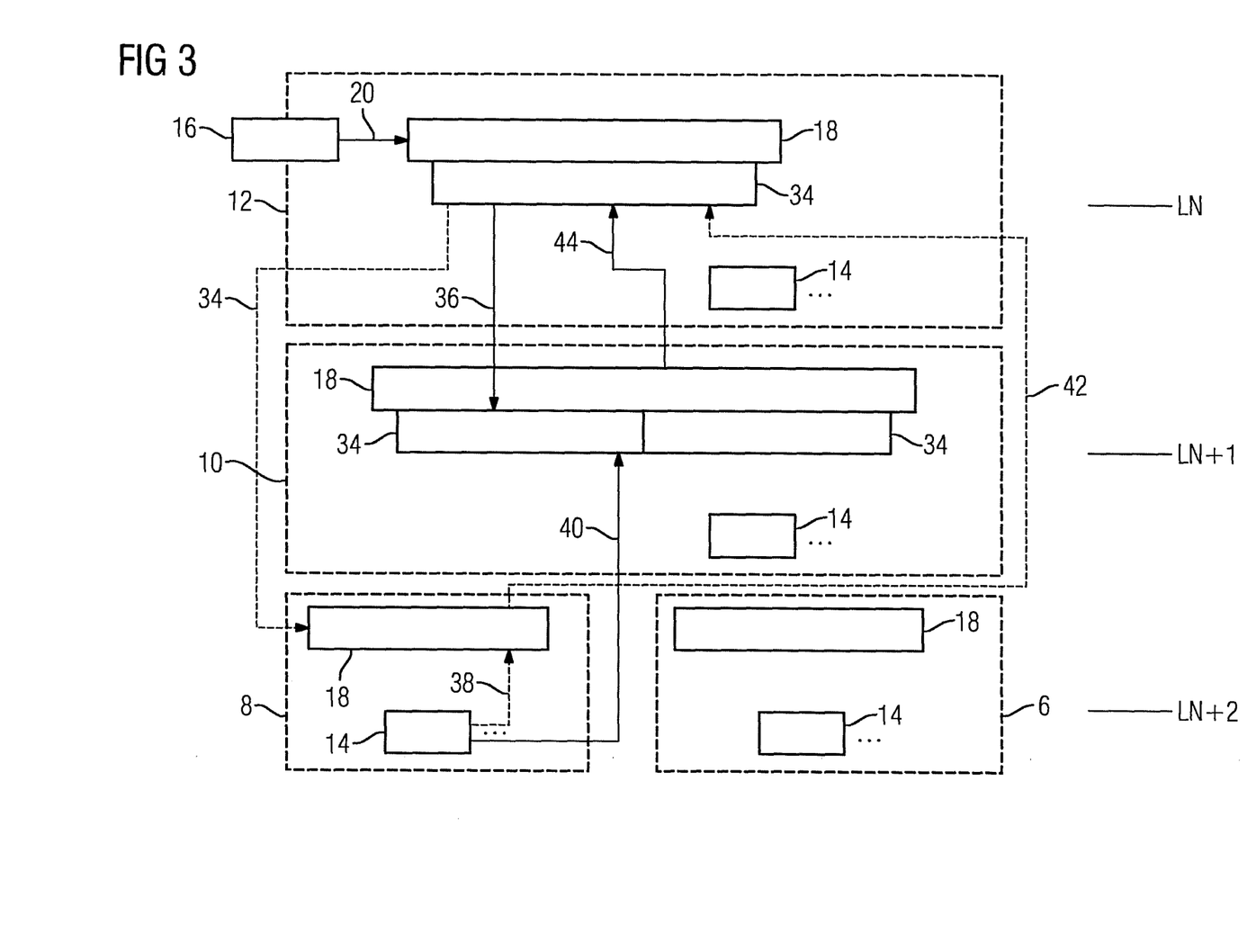
FIG. 3 shows a part of the tree structure with redundancy over one level and the resulting request and update paths.

The second part of the method consists of introducing redundancy of O&M 18 systems over one level to build up a scalable cascaded system of units 4, 8, 10, 12 with respect to network traffic and needed resources on units 4, 8, 10, 12. FIG. 3 shows the distributed redundancy mechanisms. FIG. 3 shows the same structure as FIG. 2, however, only HMI 16 of unit 12 is shown. In addition to FIG. 2, the system of FIG. 3 shows redundant O&M systems 34.

These redundant O&Ms 34 of a respective O&M 18 are not deployed on a device in the same unit 4, 8, 10, but on a device of the superordinate unit 10, 12. For instance, O&M 18 of unit 10 is redundantly deployed as O&M 34 on unit 12. Thus, services of subordinate systems are deployed in parallel to the O&M 18 services of the superordinate system (e.g., O&M 34 of unit 10 and O&M 18 of unit 12 on unit 12). Each superordinate unit 10, 12 has to be able to host the redundant O&M systems 34 of all subordinate units 4, 8, 10. FIG. 3 shows that unit 10 contains the redundant O&M services 34 of its subordinate units 4 and 8 in parallel to its own O&M 18.

The redundancy mechanism is combined with the request forwarding mechanism. FIG. 3 shows how this is realized. Unit 12 forwards a HMI 16 request (arrow 20) of a plant display of unit 8 to its subordinate unit 10 and its O&M system 18. The redundant O&M 34 of O&M 18 of unit 8 is hosted by unit 10. As a result, the request is not forwarded any more down to O&M 18 of unit 8 (arrows 34, 42). Instead, redundant O&M 34 on unit 10 is able to serve the request originating from unit 12 about process information of unit 8 (arrows 36, 44). The same applies to any request on unit 12 about unit 4. Therefore, the network traffic in cases of using request forwarding only is largely reduced.

This holds even more in cases of process information updates. Here, process information updates are sent from the AS system 14 on unit 8 only to the own O&M system 18 (arrow 38) and its redundant counterpart O&M 34 on unit 10 (arrow 40). In case of only using request forwarding, all upper level HMI requests (not only from unit 10 but even from higher levels like a potential superior unit) are forwarded all levels down to O&M 18 on unit 8.

This distributed redundancy mechanism on a superordinate unit 10, 12 is applied to O&M services 18 of the next level or some more levels of subordinate units 4, 8, 10. Unit 12 could also host all redundant O&M services 34 of unit 4 and unit 8 in addition.

Thus, the third part of the method is the robustness mechanism against failures (either network connection or a breakdown of O&M services) that are implied by a level-one-distributed-redundancy mechanism. Clients and O&M services 18 of the superordinate unit 10, 12 will be preferably served by the O&M services 18 deployed (locally) on the superordinate unit 10, 12. If the services on the superordinate unit 10, 12 are unavailable, services on the subordinate unit 4, 8, 10 are used. If, for example, superordinate unit 10 is not available, the O&M 18 for unit 12 can forward the request along the alternative path to O&M 18 on unit 8. The same applies to process information updates. Local clients will be served in a preferred way by the local O&M services 18 in the subordinate unit 4, 8, 10. If a local service is unavailable, the redundant service on the superordinate unit 10, 12 will be used.

The fourth part of the method is a result of the other three already described integral parts of the solution. O&M services 18 and functionality of a subordinate unit level LN+1, LN+2 can be either deployed on the unit 4, 8, 10 itself or on its superordinate unit 10, 12.

Figure 4:
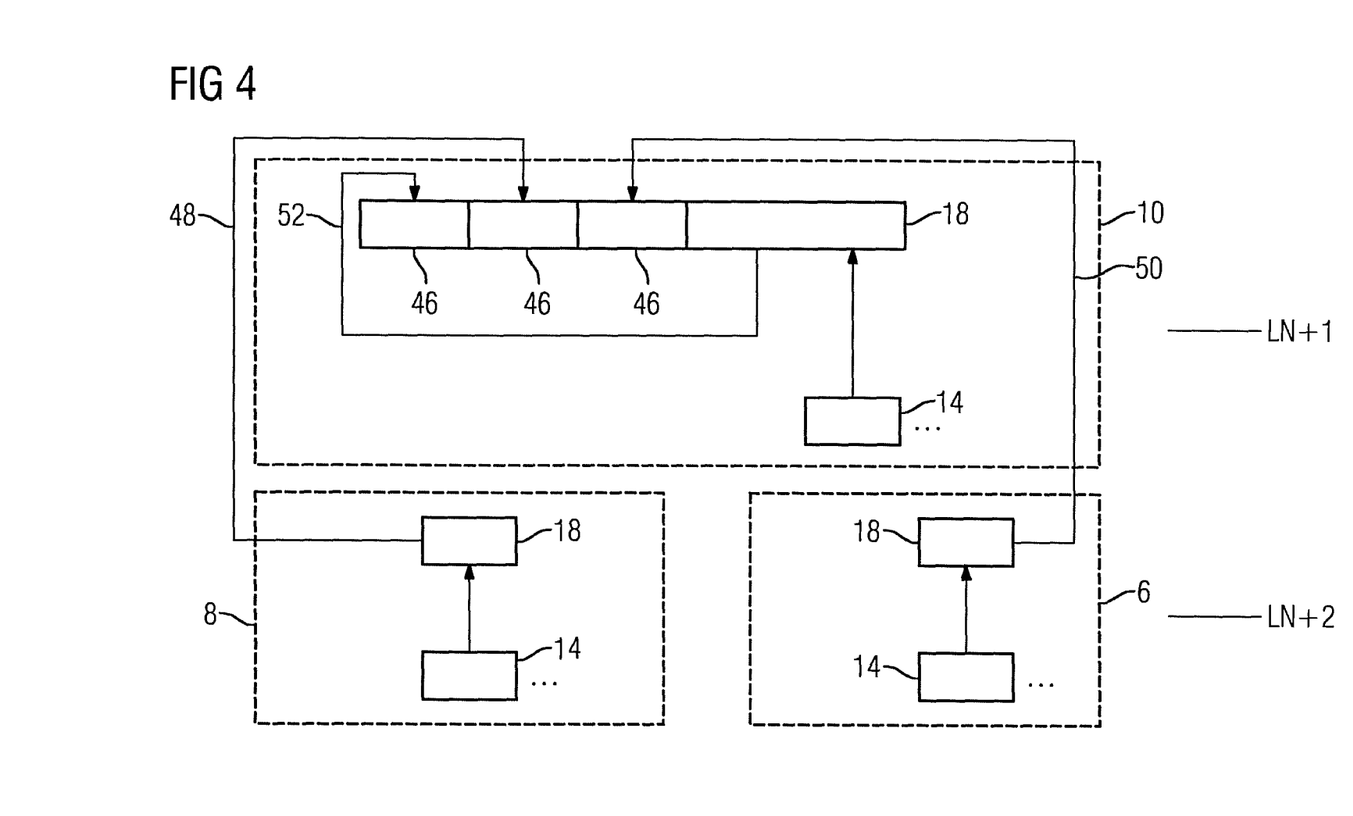
FIG. 4 shows a part of the tree structure with an archive service deployed on a superordinate unit.
Figure 5:
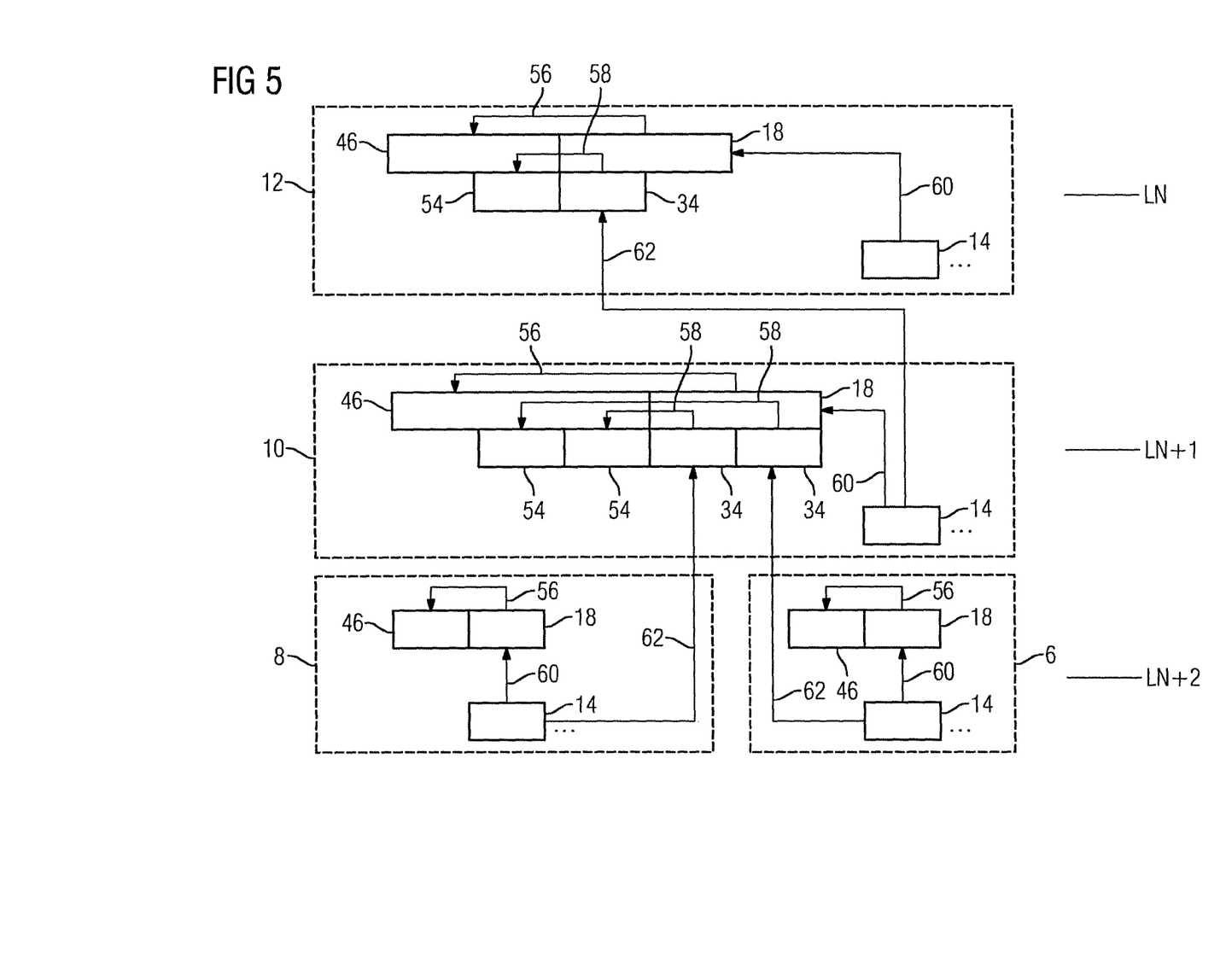
FIG. 5 shows a part of the tree structure with a combination of redundancy and an archive on a superordinate unit.

The second option applies to resource-constrained units 4, 8, 10 not being able to host the whole range of O&M functionality. FIG. 4 and FIG. 5 sketch the two options in an exemplary embodiment for an archive service of the O&M system. Naturally, it should be understood the same arrangement is possible for other services of the O&M system.

FIG. 4 shows units 4, 8 and 10 with their respective AS 14 and O&M 18. Each unit 4, 8, 10 has an assigned archive 46, however, all archives 46 are deployed on unit 10 only. Thus, for the units 4, 8 of level LN+2, the archives 46 are deployed on the superordinate unit 10 only. The data connection from each unit's O&M 18 to the assigned archives 46 is shown by arrows 48, 50, 52.

Alternatively, only the redundant archives 54 can be deployed on the respective parent unit 10, 12, as shown in FIG. 5. Here, the archives 46 are deployed on each unit 4, 8, 10, 12 locally in combination with level-one-distributed-redundancy. Thus, FIG. 5 shows a modification of FIG. 3 and therefore, only additional parts are described in the following.

In FIG. 5, each unit 4, 8, 10, 12 comprises an archive 46 deployed on the respective unit 4, 8, 10, 12 itself. The O&M 18 of each unit 4, 8, 10, 12 interacts directly with its assigned archive 46, shown by arrows 56. In addition, redundant archives 56 are deployed on the respective parent units 10, 12, i.e. unit 10 hosts the redundant archives 56 for units 4 and 8, while unit 12 hosts the redundant archive 56 for unit 10. This deployment is in parallel to the deployment of the above-described redundant O&Ms 34. Thus, the redundant O&M 34 of each unit 4, 8, 10 interacts directly with its assigned redundant archive 54 on the respective parent unit 10, 12, shown by arrows 58.

The automation systems 14 interact with the O&Ms 18 on their respective unit 4, 8, 10, 12, shown by arrows 60, and with the redundant O&Ms 34 on the respective parent unit 10, 12, shown by arrows 62.

Figure 6:
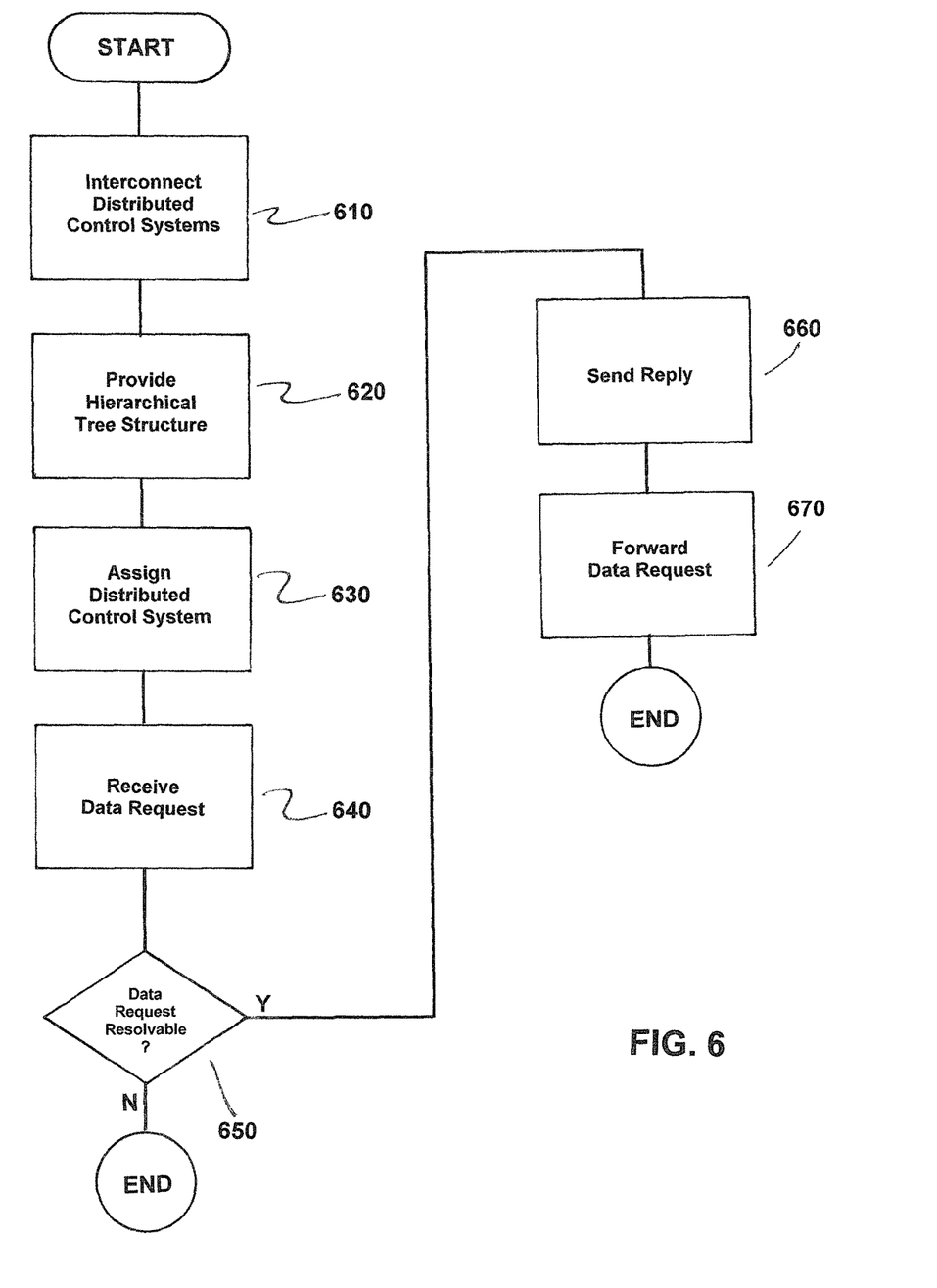
FIG. 6 is a flowchart of the method in accordance with the invention.

FIG. 6 is a flowchart of a method for controlling a grid of plants, where each plant includes a distributed control system (2) with operation and monitoring (18) functionality. The method comprises interconnecting distributed control systems (2) via a network, as indicated in step 610.

Next, a hierarchical tree structure (1) having at least two levels (LN) for the network is provided, as indicated in step

620. Next, each distributed control system (2) is assigned to a node of the hierarchical tree structure (1), as indicated in step 630.

A data request is then received at a parent node control system (2, 4), as indicated in step 640.

Whether the received data request is resolvable by the parent node control system (2, 4) is now determined, as indicated in step 650. Next, a reply to the data request is sent, if the data request is resolvable by said parent node control system (2, 4), as indicated in step 660. The data request is then forwarded to at least one child nodes of said parent node control system (2, 4), if the data request is resolvable by the parent node control system (2, 4), as indicated in step 670.

Thus, while there have been shown, described and pointed out fundamental novel features of the invention as applied to a preferred embodiment thereof, it will be understood that various omissions and substitutions and changes in the form and details of the method and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for controlling a grid of plants, each plant having a distributed control system with operation and monitoring functionality, the method comprising:
   interconnecting the distributed control systems via a network;
   providing a hierarchical tree structure having at least two levels for said network;
   assigning each distributed control system to a node of the hierarchical tree structure;
   receiving a data request at a parent node control system;
   determining whether the received data request is resolvable by said parent node control system;
   sending a reply to the data request, if the data request is resolvable by said parent node control system; and
   forwarding the data request to at least one child nodes of said parent node control system, if the data request is unresolvable by said parent node control system.

2. The method of claim 1, further comprising:
   assigning a virtual control system to a parent node control system having a number of child nodes.

3. The method of claim 1, further comprising:
   forwarding a reply to the data request from said child node to said parent node control system.

4. The method of claim 1, further comprising:
   forwarding updated data information from a child node via its respective parent node control system to a root control system of the network.

5. The method of claim 1, further comprising:
   providing a redundant control system for a distributed control system of a node;
   wherein said redundant control system is assigned to an ancestor node of said node.

6. The method of claim 5, wherein said redundant control system is assigned to the parent node control system of said node.

7. The method of claim 1, further comprising:
   providing an operation and monitoring service for a distributed control system of a node;
   wherein said operation and monitoring service is assigned to an ancestor node of said node.

8. The method of claim 7, wherein said operation and monitoring service is assigned to the parent node control system of said node.

9. A grid of plants, each plant having a distributed control system with operation and monitoring functionality, said grid of plants being controlled by:
   interconnecting the distributed control systems via a network;
   providing a hierarchical tree structure having at least two levels for said network;
   assigning each distributed control system to a node of the hierarchical tree structure;
   receiving a data request at a parent node control system;
   determining whether the received data request is resolvable by said parent node control system;
   sending a reply to the data request, if the data request is resolvable by said parent node control system; and
   forwarding the data request to at least one child nodes of said parent node control system, if the data request is unresolvable by said parent node control system.

10. A distributed control system comprising:
    at least one of (i) a parent node interface and (ii) a child node interface, and
    means for enabling the distributed control system to operate by:
    interconnecting distributed control systems via a network;
    providing a hierarchical tree structure having at least two levels for said network;
    assigning each distributed control system to a node of the hierarchical tree structure;
    receiving a data request at a parent node control system;
    determining whether the received data request is resolvable by said parent node control system;
    sending a reply to the data request, if the data request is resolvable by said parent node control system; and
    forwarding the data request to at least one child nodes of said parent node control system, if the data request is unresolvable by said parent node control system.

11. A plant including the distributed control system of claim 10.

12. A grid of plants comprising:
    at least one plant including a distributed control system comprising:
    at least one of (i) a parent node interface and (ii) a child node interface, and
    means for enabling the distributed control system to operate by:
    interconnecting distributed control systems via a network;
    providing a hierarchical tree structure having at least two levels for said network;
    assigning each distributed control system to a node of the hierarchical tree structure;
    receiving a data request at a parent node control system;
    determining whether the received data request is resolvable by said parent node control system;

sending a reply to the data request, if the data request is resolvable by said parent node control system; and forwarding the data request to at least one child nodes of said parent node control system, if the data request is unresolvable by said parent node control system; and at least one virtual control system comprising:

a child node interface, and means for enabling the virtual control system to operate by assigning the virtual control system to a parent node control system having a number of child nodes.

* * * * *